United States Patent [19]
Gardner et al.

[11] Patent Number: 5,254,048
[45] Date of Patent: Oct. 19, 1993

[54] BELT TENSIONING SYSTEM, BELT TENSIONER THEREFOR AND METHODS OF MAKING THE SAME

[75] Inventors: David E. Gardner, Royal Oak; David B. Novak, Bloomfield Hills, both of Mich.

[73] Assignee: Dayco Products, Inc., Dayton, Ohio

[21] Appl. No.: 970,345

[22] Filed: Oct. 30, 1992

Related U.S. Application Data
[62] Division of Ser. No. 832,297, Feb. 7, 1992.

[51] Int. Cl.⁵ ............................................. F16H 7/00
[52] U.S. Cl. ................................................... 474/135
[58] Field of Search ............... 474/101, 109, 113–117, 474/133, 135, 136, 138

[56] References Cited
U.S. PATENT DOCUMENTS

| | | | |
|---|---|---|---|
| 5,030,172 | 7/1991 | Green et al. | 474/135 |
| 5,141,475 | 8/1992 | Sajczvk et al. | 474/135 |
| 5,190,502 | 3/1993 | Gardner et al. | 474/135 |

Primary Examiner—Thuy M. Bui
Attorney, Agent, or Firm—Joseph V. Tassone

[57] ABSTRACT

A belt tensioning system, a belt tensioner therefor and methods of making the same are provided, the belt tensioning system comprising a tensioner arm pivotally mounted to a support, and a wound coiled spring having opposed ends one of which is operatively interconnected to an abutment of the support and the other of which is operatively interconnected to the arm, the arm having a shoulder for being engaged by the one of the opposed ends of the wound coiled spring so as to permit removal of the arm and the wound coiled spring as a self-contained unit from the support when the arm is pivoted to a certain position where the shoulder of the arm engages the one end of the spring and effectively moves the one end of the wound coiled spring out of contact with the abutment of the support.

10 Claims, 6 Drawing Sheets

BELT TENSIONING SYSTEM, BELT TENSIONER THEREFOR AND METHODS OF MAKING THE SAME

CROSS REFERENCE TO RELATED APPLICATIONS

This application is a divisional patent application of its copending parent patent application, Ser. No. 832,297, filed Feb. 7, 1992.

BACKGROUND OF THE INVENTION

1. Field of the Invention

This invention relates to a new belt tensioning system and to a new belt tensioner therefor as well as to new methods of making such a new belt tensioning system and such a new belt tensioner.

2. Prior Art Statement

It is known to provide a belt tensioning system comprising a support means having an abutment means, an endless transmission belt construction carried by the support means and arranged to move in a certain path relative to the support means, an arm pivotally mounted to the support means, a pulley rotatably carried by the arm and being in engagement with the belt construction, and a wound coiled spring having opposed ends one of which is operatively interconnected to the abutment means of the support means and the other of which is operatively interconnected to the arm whereby the force of the wound coiled spring tends to pivot the arm in a direction that urges the pulley against the belt construction with a force that tensions the belt construction. For example, see the U. S. Pat. No. to Henderson, 4,886,483.

SUMMARY OF THE INVENTION

It is one of the features of this invention to provide a new belt tensioning system wherein the belt tensioner comprises an arm and a wound coiled spring that can be carried by the arm so as to provide a self-contained unit and which when assembled to the support means of the system provides a means to transfer one end of the spring to an abutment means on the support means so that that end of the spring will be operatively interconnected to the support means and permit the force of the spring to provide a tensioning force on an endless transmission belt construction that is carried by the support means to move in an endless path thereon.

In particular, it was found according to the teachings of this invention that the arm of the belt tensioner can be provided with a shoulder means against which the one end of the wound coiled spring can engage so as to permit the arm and spring to be a self-contained unit to be inserted in the belt tensioning system and be removed therefrom and when assembled to the support means can transfer the engagement of that one end of the spring from the shoulder means of the arm to an abutment means on the support means to effectively interconnect that one end to the support means whereby the force of the spring tends to pivot the arm in a direction to apply a tensioning force to a belt construction that is engaged by a pulley rotatably carried by the arm.

For example, one embodiment of this invention comprises a belt tensioning system comprising a support means having an abutment means, an endless transmission belt construction carried by the support means and arranged to move in a certain path relative to the support means, an arm pivotally mounted to the support means, a pulley rotatably carried by the arm and being in engagement with the belt construction, and a wound coiled spring having opposed ends one of which is operatively interconnected to the abutment means of the support means and the other of which is operatively interconnected to the arm whereby the force of the wound coiled spring tends to pivot the arm in a direction that urges the pulley against the belt construction with a force that tensions the belt construction, the arm having a shoulder means for being engaged by the one of the opposed ends of the wound coiled spring by the force of the wound coiled spring so as to permit removal of the arm and the wound coiled spring as a self-contained unit from the support means when the arm is pivoted to a certain position where the shoulder means of the arm engages the one end of the wound coiled spring and effectively moves the one end of the wound coiled spring out of contact with the abutment means of the support means.

Accordingly, it is an object of this invention to provide a new belt tensioning system having one or more of the novel features of this invention as set forth above or hereinafter shown or described.

Another object of this invention is to provide a new method of making such a belt tensioning system, the method of this invention having one or more of the novel features of this invention as set forth above or hereinafter shown or described.

Another object of this invention is to provide a new belt tensioner for such a belt tensioning system, the belt tensioner of this invention having one or more of the novel features of this invention as set forth above or hereinafter shown or described.

Another object of this invention is to provide a new method of making such a belt tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
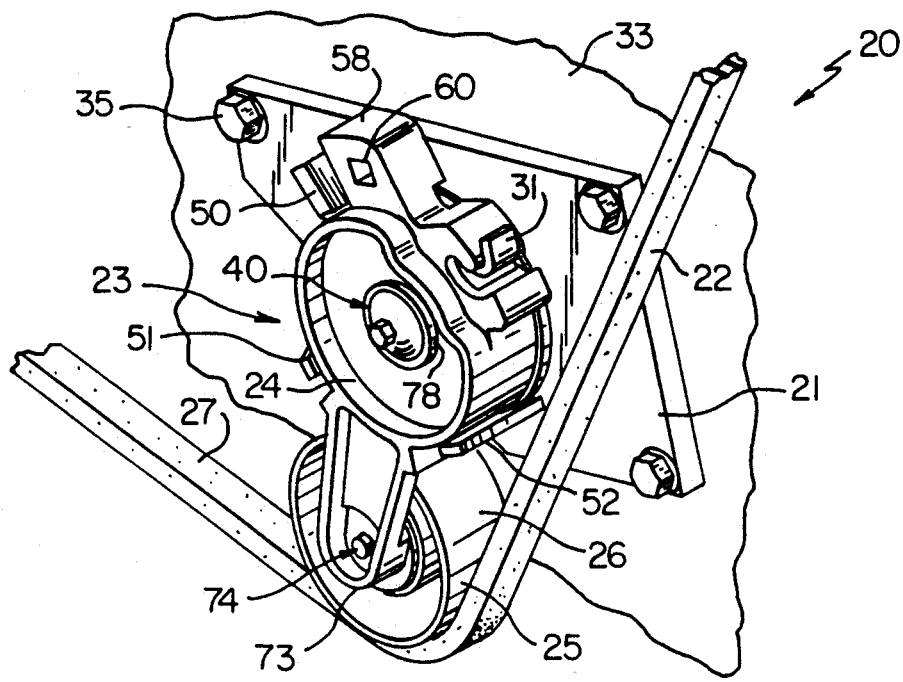
FIG. 1 is a fragmentary perspective view illustrating the new belt tensioning system of this invention utilizing the new belt tensioner of this invention.

While the various features of this invention are hereinafter illustrated and described as being particularly adapted to provide a belt tensioner for operating on a belt construction adapted to move in a certain path, it is to be understood that the various features of this invention can be utilized singly or in various combinations thereof to provide a belt tensioner for other systems as desired.

Therefore, this invention is not to be limited to only the embodiment illustrated in the drawings because the drawings are merely utilized to illustrate one of the wide variety of uses of this invention.

Referring now to FIG. 1, the new belt tensioning system of this invention is generally indicated by the reference numeral 20 and comprises a support means 21, an endless transmission belt construction 22 that is carried by the support means 21 and is arranged to move in a certain path relative to the support means 21 and a belt tensioner of this invention that is generally indicated by the reference numeral 23 for tensioning the belt construction 22 in a manner hereinafter set forth.

The belt tensioner 23 comprises a metallic or plastic arm 24 that is pivotally mounted to the support means 21 in a manner hereinafter set forth and carrying a rotatable pulley 25 that has a belt engaging surface 26 disposed in rolling engagement with the side 27 of the belt construction 22 and normally being urged in the direction of the arrow 28 in FIG. 12 by the force of a wound coiled spring 29 that has one end 30 thereof operatively interconnected to the support means 21 in a manner hereinafter set forth and the other end 31 thereof operatively interconnected to the arm 24.

The wound coiled spring 29 comprises a helically wound flat metallic wire spring means which may have the adjacent coils thereof interleaved with an anti-friction polymeric strip 32 whereby the spring means 29 functions in a manner well known in the art. For example, see the aforementioned U.S. Pat. No. to Henderson 4,886,483, whereby this U.S. patent is being incorporated into this disclosure by this reference thereto.

The tensioner 23 of this invention is adapted to be inserted into the support means 21 and be removed therefrom with the spring means 29 being carried thereby in a self-contained manner. However, the spring means 29 is adapted to have the inner end 30 thereof effectively disconnected from the arm 24 and operatively interconnected to the support means 21 in a manner hereinafter set forth so that the force of the wound coiled spring means 29 tends to pivot the arm in the direction of the arrow 28 of FIG. 12 so that the pulley 25 will be urged against the belt construction 22 with a force that tensions the belt construction 22 all in a manner and for reasons that are fully set forth in the aforementioned U.S. Pat. No. to Henderson, 4,886,483, whereby only the details of the structure of the belt tensioning system 20 and belt tensioner 23 necessary to understand the features of this invention will be hereinafter described.

The support means 21 comprises a supporting structure 33, such as an internal combustion engine (not shown) of a transportation vehicle or the like (not shown), and a metallic or plastic mounting plate or bracket 34 that is fastened to the supporting structure 33 in any suitable manner, such as by the metallic bolts 35 whereby the plate 34 is held fixed to the supporting structure 33.

Figure 2:
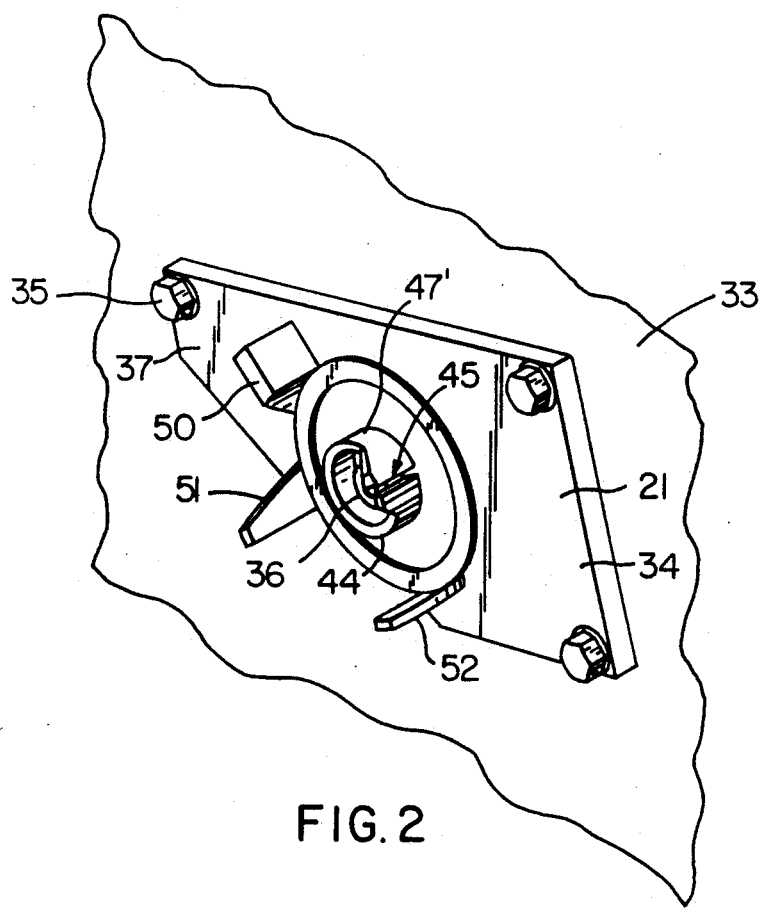
FIG. 2 is a view similar to FIG. 1 and illustrates the support means of the system of FIG. 1 when the belt tensioner and belt construction are removed therefrom.
Figure 6:
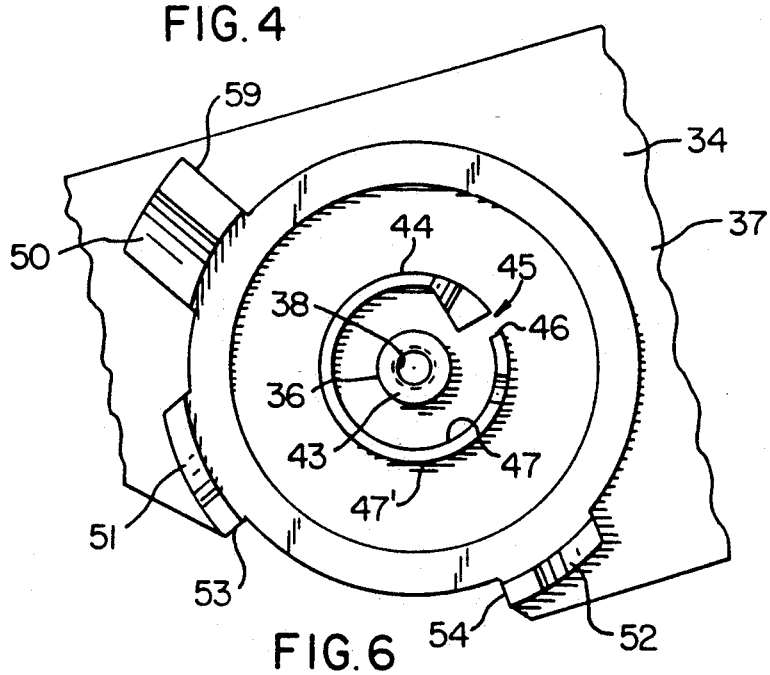
FIG. 6 is a fragmentary front view of the support means of FIG. 2.
Figure 9:
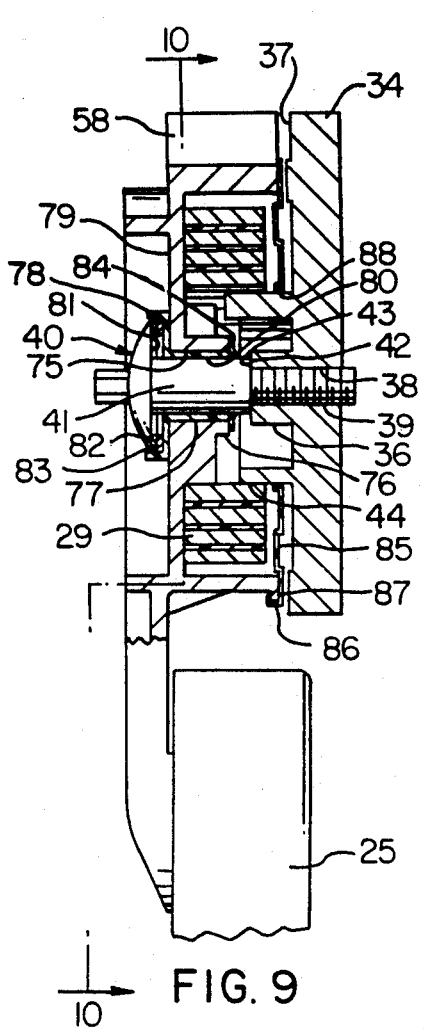
FIG. 9 is a fragmentary cross-sectional view taken on line 9—9 of FIG. 7.

The plate 34 as illustrated in FIGS. 2 and 6 has a cylindrical hub 36 extending outwardly from a side 37 of the plate 34 and is provided with an internally threaded opening 38 which is adapted to receive an externally threaded end 39 of a metallic fastening member 40 in a manner hereinafter set forth, the fastening member 40 having an unthreaded enlarged cylindrical shank portion 41 joined to the threaded portion 39 by a transversely disposed annular flat shoulder 42 which is adapted to engage against a flat annular shoulder 43 on the cylindrical part 36 of the support plate 34 as illustrated in FIG. 9 whereby the fastening member 40 is adapted to fasten the tensioner 23 to the plate 34 in a manner hereinafter set forth so that the fastening member 40 is fixed from movement relative to the support means 21.

The support plate 34 has an annular wall 44 that extends outwardly from the side 37 of the plate 34 in a concentric manner about the cylindrical hub 36 and has a slot 45 formed therein and defining an abutment means 46 for having the end 30 of the spring 29 engaged thereagainst in the manner illustrated in FIG. 12 to operatively interconnect the end 30 to the support means 21 as will be apparent hereinafter.

The wall 44 of the support plate 34 has an inner arcuate surface 47 adapted to be telescopically disposed with an outer arcuate surface 48 on a wall 49 of the arm 24 of the belt tensioner 23 in a manner hereinafter set forth.

The support plate 34 of the support means 21 has a plurality of spaced apart walls 50, 51 and 52 extending outwardly from the side 37 thereof with the walls 51 and 52 respectively defining surfaces 53 and 54 for respectively being engagable by surfaces 55 and 56 on the arm 24 of the belt tensioner 23.

Figure 7:
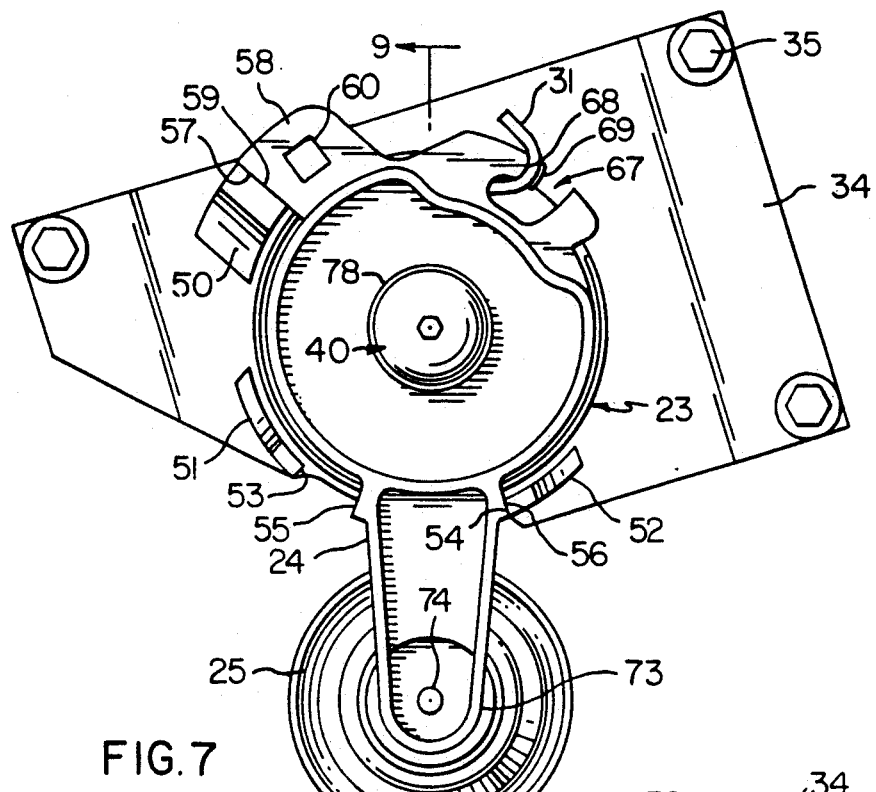
FIG. 7 is a reduced front view illustrating how the belt tensioner of FIG. 4 is initially assembled to the support means of FIG. 6.

In addition, the arm 24 has a stop surface 57 on an extension 58 thereof that is adapted to abut against a stop surface 59 on the wall 50 of the plate 34 in the manner illustrated in FIG. 7. The surfaces 54 and 56 are initial assembly alignment means and the surfaces 54, 56, 57 and 59 are slightly angled. The surfaces 57 and 59 are parallel whereas the surfaces 54 and 56 are opposed in angle such that at initial contact, the surfaces 54 and 56 meet at one end thereof and at final assembly, the surfaces 57 and 59 mate while the surfaces 54 and 56 are spaced apart.

Figure 8:
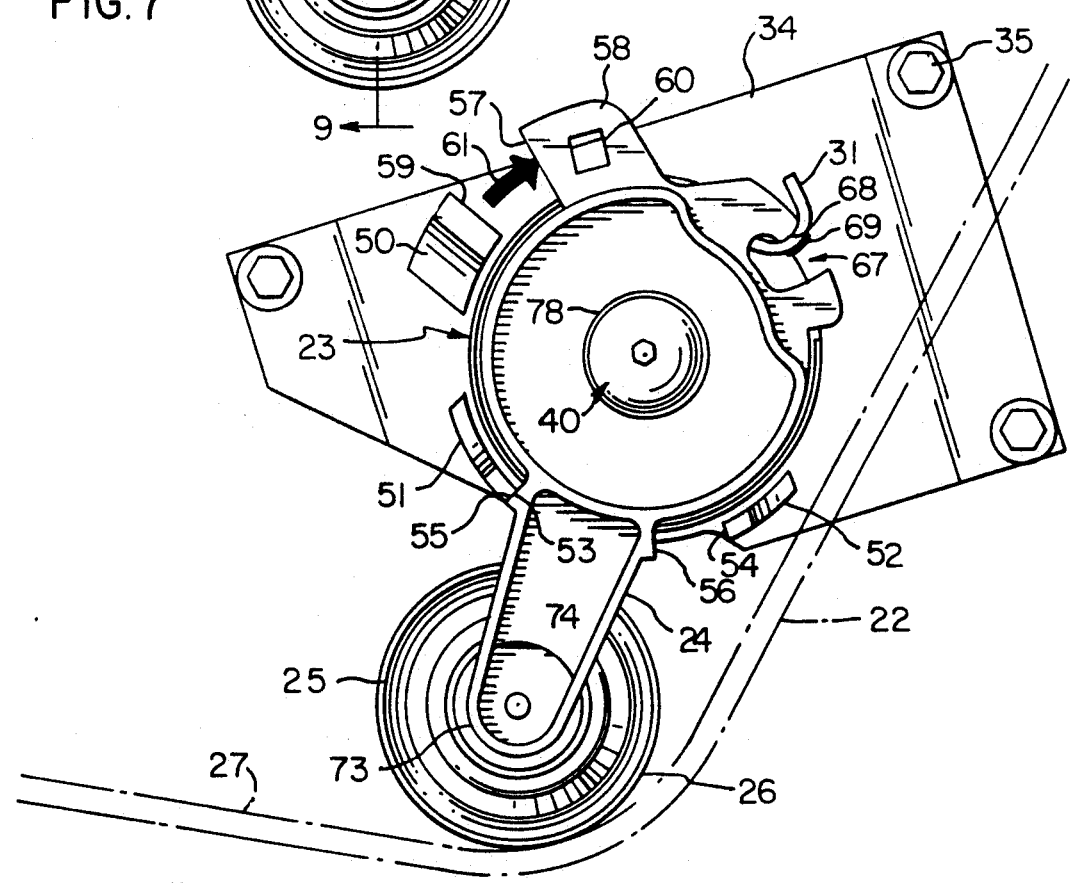
FIG. 8 is a view similar to FIG. 7 and illustrates how the belt tensioner of FIG. 7 is to be pivoted in order to permit the same to apply a tensioning force to a belt construction that is illustrated in phantom lines in FIG. 8.

When the tensioner 23 is first mounted to the plate 34 as illustrated in FIG. 7, a suitable tool (not shown) is disposed in a rectangular opening 60 of the extension 58 by an operator for rotating the arm 24 in the manner illustrated by the arrow 61 in FIG. 8 in order to assemble the belt construction 22 in the system 20 and permit the pulley 25 to apply its tensioning force when the tool is removed from the opening 60 all in a manner well known in the art.

The wall 48 of the arm 24 defines a flat shoulder means 62 and a projection 63 that extends beyond the shoulder 62 at one end thereof whereby said projection 63 is disposed remote from a flat surface 64 of the arm 24 and from which a cylindrical wall 65 and an inner cylindrical wall 66 extend as illustrated, the wall 65 having a slot 67 therein that defines an arcuate shoulder means 68 and a projection 69 that extends outwardly beyond the shoulder means 68 at one end thereof.

In this manner, when the wound coiled spring 29 is assembled to the arm 24, the inner end 30 of the spring 29 is adapted to be disposed against the shoulder 62 and be held in place by the projection 63 while the outer end 31 is disposed against the shoulder 68 to be held therein by the projection 69, the spring 29 in such assembled condition still being in a wound condition thereof so that the same has a force tending to unwind the coils 70 thereof in a manner well known in the art so that the spring 29 remains in its assembled condition by the spring force thereof.

Figure 10:
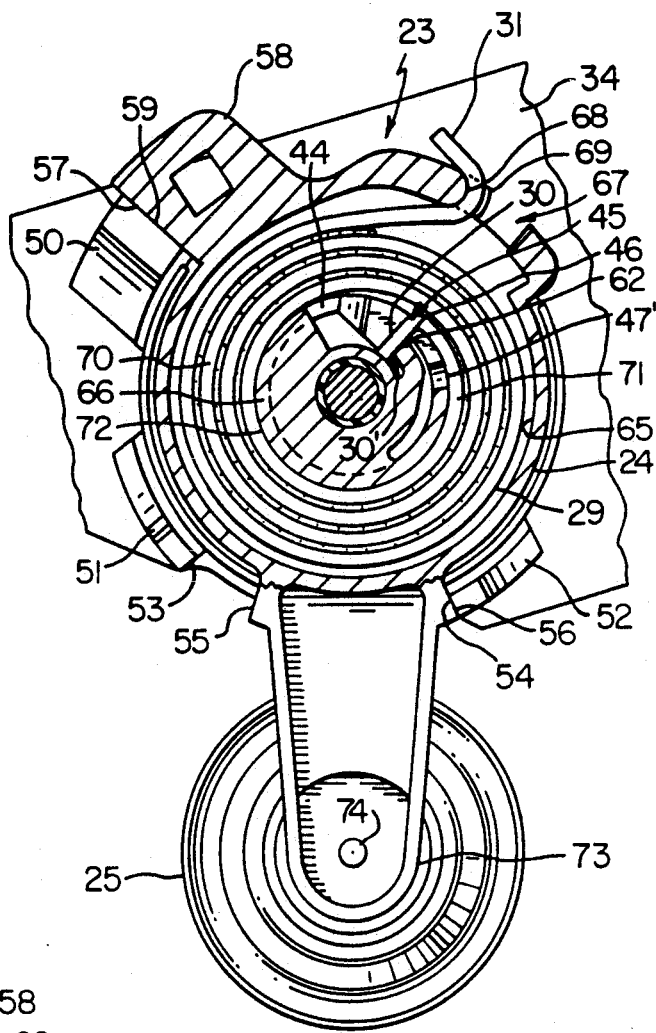
FIG. 10 is a fragmentary cross-sectional view taken on line 10—10 of FIG. 9.
Figure 11:
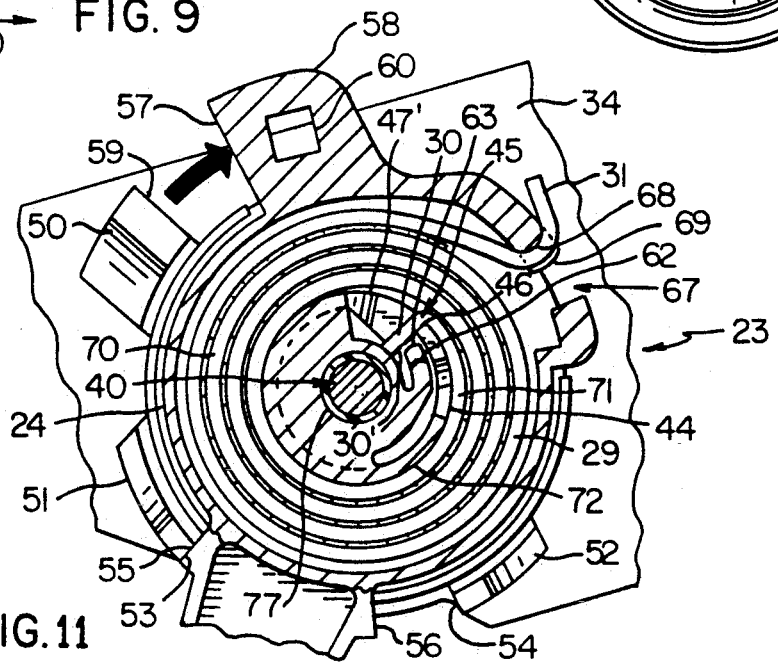
FIG. 11 is a fragmentary view similar to FIG. 10 and illustrates the tensioner disposed in a tensioning position thereof.
Figure 12:
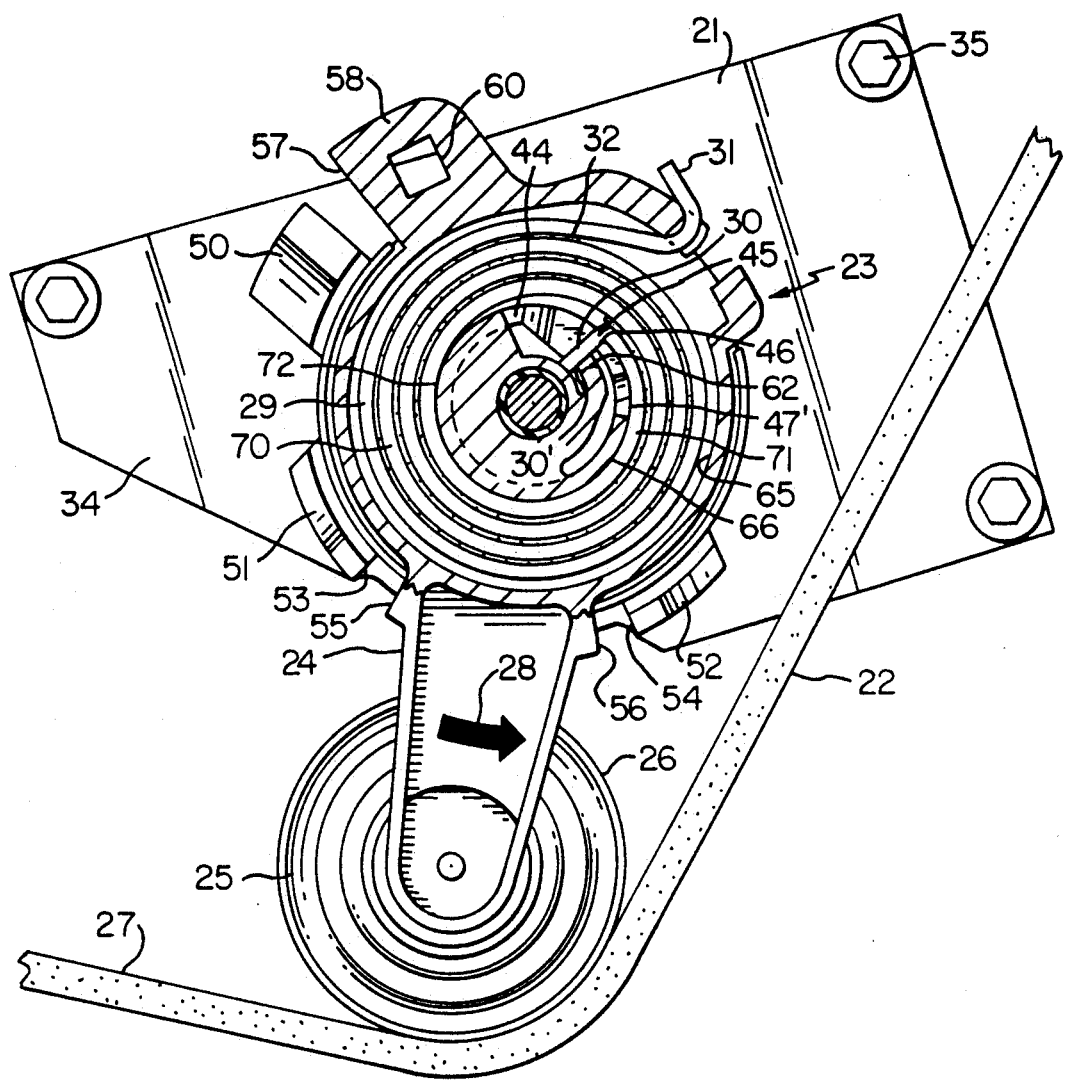
FIG. 12 is a view similar to FIG. 11 and illustrates the tensioner of FIG. 11 applying a tensioning force to a belt construction.

The end 30 of the spring 29 is disposed substantially at a right angle relative to the inner coil 71 of the spring 29 and is adapted to have part of its surface disposed against the external peripheral surface 72 of the inner wall 66 of the arm 24 as illustrated in FIGS. 10, 11 and 12.

The pulley 25 is adapted to be rotatably mounted on a cylindrical shaft means 72' at the end 73 of the arm 24 and fixed thereto, such as by a threaded fastening member 74 in a manner well known in the art whereby the pulley 25 is adapted to rotate relative to the arm 24.

The arm 24 is adapted to be rotatably mounted on the unthreaded shank portion 41 of the fastening member 40 as will be apparent hereinafter as a cylindrical opening 75 passes through a central hub portion 76 of the arm 24 and is adapted to be lined with a cylindrical bushing 77 formed of any suitable antifriction material, such as a polymeric material, that has an enlarged flanged end 78 adapted to be disposed against a side 79 of the arm 24 as illustrated in FIG. 9.

In this manner, the fastening member 40 is adapted to have the cylindrical portion 41 thereof disposed in an opening 80 of the cylindrical portion of the bushing 77 as illustrated in FIG. 9 and have an enlarged head 81 thereof compact biasing means, such as one or more wavy washers 82 and 83 between the head 81 and the flange structure 78 of the bushing 77 so as to compact the same against the side 79 of the arm 24 when the threaded portion 39 of the fastening member 40 is fully threaded into the threaded opening 38 of the plate 34 in the manner illustrated in FIG. 9. In this manner, the annular shoulder 42 of the fastening member 40 abuts against the annular shoulder 43 of the projection 36 as illustrated in FIG. 11 whereby the fastening member 40 is held from rotation while the arm 24 is adapted to pivot or rotate relative thereto on the bushing 77 and, thus, pivot relative to the support means 21 even though the force of the biasing means 82 and 83 has axially moved the arm 24 on the fastening member 40 until the surface means of a member 85 engages the facing surface means of the plate 34 for subsequent sliding movement thereon.

Figure 3:
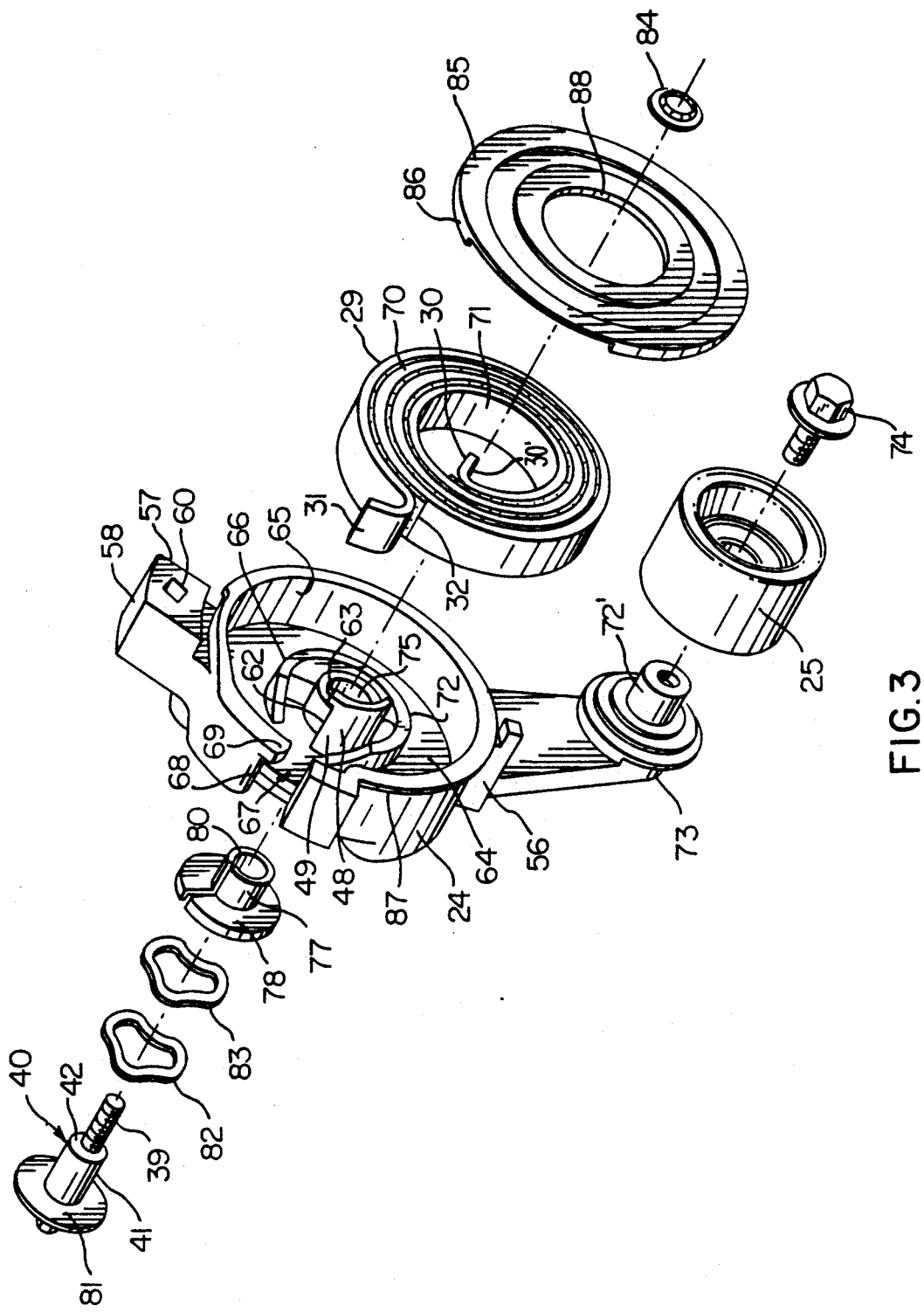
FIG. 3 is an exploded perspective view of the various parts that form the new belt tensioner of this invention.
Figure 4:
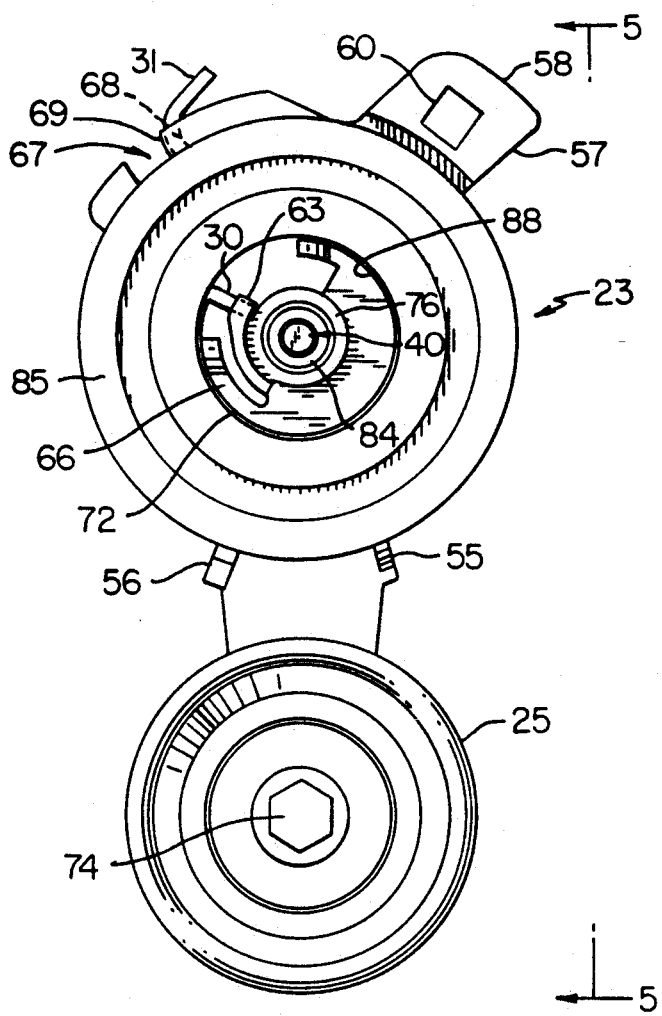
FIG. 4 is an enlarged rear view of the belt tensioner of this invention.
Figure 5:
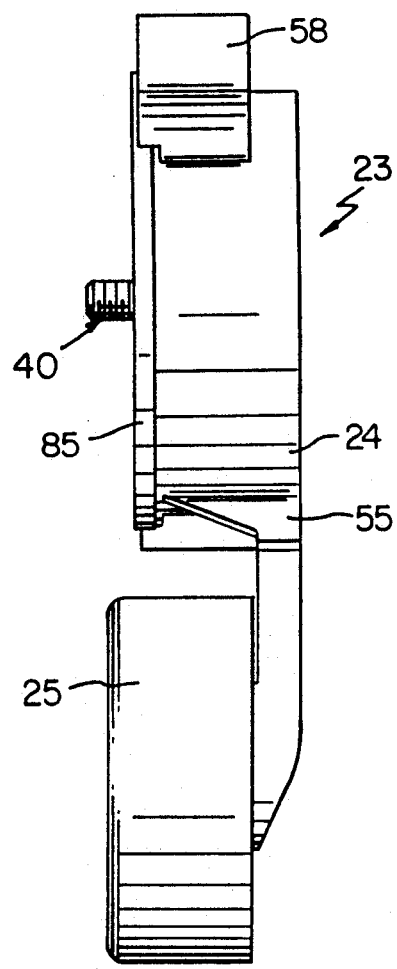
FIG. 5 is a side view of the belt tensioner of FIG. 4 and is taken in the direction of the arrows 5—5 of FIG. 4.

However, in order to retain the fastening member 40 in its assembled relation with the arm 24 and spring 29 when the belt tensioner 23 is separate from the support means 21, a retaining member 84, FIG. 3, can be installed on the end 41 of the fastening member 40 in its assembled relation with the arm 24 to retain the fastening member 40 thereto, such retainer 84 also being shown in FIG. 9 for purposes of clarity.

In order to enclose the assembled spring 29 in the annular wall 65 of the arm 24, the member 85 is additionally utilized as a dust cover and the same has an annular flange 86 that is snap-fitted over an annular edge 87 of the wall 65 in the manner illustrated in FIG. 9, the member 85 having an opening 88 passing therethrough for permitting the member 85 to be telescoped onto the annular wall 44 of the support plate 34 also as illustrated in FIG. 9.

Thus, it can be seen that the belt tensioner 23 of this invention can be formed of relatively few parts by the method of this invention to provide a self-contained unit that comprises the arm 24, the pulley 25 and the wound coiled spring 29 which results in a relatively inexpensive belt tensioner through the change in the design thereof over the design of prior known belt tensioners, such as the belt tensioner set forth in the aforementioned U.S. Pat. No. to Henderson, 4,886,483.

When it is desired to assemble the belt tensioner 23 of this invention, in the system 20 which has the support plate 34 previously fastened to the support structure 33 by the bolts 35 in the manner previously set forth, the belt tensioner 23 is assembled thereto in the manner illustrated in FIGS. 7 and 10 whereby the end 30 of the spring 29 is disposed in the slot 45 of the wall 44 and the means 55 and 56 of the arm 24 are disposed between the means 53 and 54 of the plate 34 while the stop surface 57 of the extension 58 slides past the stop surface 59 of the wall 50 of the plate 34. In addition, the surface 49 of the wall 48 telescopes within the surface 47 of the wall 44 of the support plate 34 and part of the inner coil 71 of the spring 29 slips over the outer peripheral surface 47' of the wall 44 in the manner illustrated in FIG. 9.

The fastening member 40 then has its threaded portion 39 threaded into the threaded opening 38 of the projection 36 until the annular shoulder 42 of the fastening member 40 abuts against the surface 43 of the projection 36 in the manner illustrated in FIG. 9 so that the biasing means 82 and/or 83 is compacted between the enlarged head 81 of the fastening member 40 and the flange 78 of the bushing 77 so as to compact the flange 78 of the bushing 77 against the side 79 of the arm 24 and compact the member 85 of the arm 24 against the facing surface means of the support plate 34.

In this manner, the belt tensioner 23 is fully assembled to the support plate 34 and can be disposed in its operative position for tensioning the endless transmission belt construction 22 in a manner now to be described.

Once it is desired to cause the belt tensioner 23 to tension the belt construction 22, an appropriate tool is inserted in the opening 60 of the lug 58 of the arm 24 and is then utilized to rotate the arm 24 in the clockwise direction as represented by the arrow 61 in FIG. 8 to cause the end 30 of the spring 29 to have its side 30' be placed against the abutment 46 of the wall 44 of the plate 34 as the shoulder 62 of the rotating arm 24 moves out of engagement with the surface 30' of the end 30 of the spring 29 so that the end 30 of the spring 29 is now operatively interconnected to the support means 21, such rotation of the arm 24 in the clockwise direction as illustrated in FIGS. 8 and 11 by the arrow 61 causing the end 31 of the spring 29 to be moved in a direction to further wind up the spring 29. In this manner, when the side 27 of the belt 22 is placed against the surface 26 of the pulley 25 in the manner illustrated in FIGS. 1, 8 and 12, the force of the spring 29 tending to unwind the spring 29 is now applied against the side 27 of the belt construction 22 as represented by the arrow 28 in FIG.

12 to tension the belt construction 22 in a manner well known in the art. Such tensioning position of the belt tensioner 23 has the arm 24 with its surfaces 55 and 56 disposed intermediate the surfaces 53 and 54 on the support plate 34 as illustrated in FIG. 12.

When it is desired to remove the belt tensioner 23 from the support plate 34, the belt construction 22 is removed from contact with the pulley 25 and the arm 24 is permitted to move in a counterclockwise direction until the stop surface 57 thereof engages against the stop surface 59 of the plate 34 at which time the shoulder 62 of the rotating arm 24 now comes into engagement with the surface 30' of the end 30 of the spring 29 and, in effect, removes the surface 30' of the end 30 of the spring 29 from the abutment 46 of the plate 34 so that the end 30 of the spring 29 is no longer operatively interconnected to the support means 21. At this time, the fastening member 40 can be removed from the threaded opening 38 of the support plate 34 and the belt tensioner 23 can be removed as a self-contained unit from the plate 34 as the spring 29 is carried thereby.

Thus, another belt tensioner 23 of this invention can now be utilized with the plate 34 in the manner previously set forth should the reason for having removed the previous belt tensioner 23 be to replace the same.

In any event, it can be seen that this invention not only provides a new belt tensioning system and a new belt tensioner therefor, but also this invention provides new methods of making such a new belt tensioning system and such a new belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a belt tensioning system comprising a support means having an abutment means, an endless transmission belt construction carried by said support means and arranged to move in a certain path relative to said support means, an arm pivotally mounted to said support means, a pulley rotatably carried by said arm and being in engagement with said belt construction, and a wound coiled spring having opposed ends one of which is operatively interconnected to said abutment means of said support means and the other of which is operatively interconnected to said arm whereby the force of said wound coiled spring tends to pivot said arm in a direction that urges said pulley against said belt construction with a force that tensions said belt construction, the improvement comprising the steps of forming said arm to have a shoulder means for being engaged by said one of said opposed ends of said wound coiled spring by the force of said wound coiled spring so as to permit removal of said arm and said wound coiled spring as a self-contained unit from said support means when said arm is pivoted to a certain position where said shoulder means of said arm engages said one end of said wound coiled spring and effectively moves said one end of said wound coiled spring out of contact with said abutment means of said support means, and mounting said arm to said support means with a single fastening member.

2. A method as set forth in claim 1 and including the step of forming said wound coiled spring to comprise a substantially flat wire helical spring wherein said opposed ends thereof comprise an inner end and an outer end.

3. A method as set forth in claim 2 and including the step of forming said one end of said wound coiled spring to comprise said inner end thereof.

4. A method as set forth in claim 2 and including the step of forming said support means to have a pair of spaced apart stop means respectively engageable by said arm to limit pivotal movement of said arm in each pivoting direction of movement thereof.

5. A method as set forth in claim 3 and including the step of forming said arm to be disposed closely adjacent one of said stop means when said arm is in said certain position thereof.

6. A method as set forth in claim 1 an including the step of forming said support means to have cylindrical hub extending outwardly therefrom, and forming said arm to have surface means disposed for movement relative to said hub.

7. A method as set forth in claim 1 and including the steps of forming said support means to have an opening therein, disposing said fastening member to be rotatably carried by said arm, and disposing said fastening member into said opening so as to fasten said arm to said support means.

8. A method as set forth in claim 7 and including the step of forming said arm to be rotatably disposed on said fastening member.

9. A method as set forth in claim 8 and including the step of disposing a bushing between said fastening member and said arm to facilitate rotational movement therebetween.

10. A method as set forth in claim 9 and including the steps of forming said bushing to have an annular flange engaging said arm, and compacting said annular flange against said arm with an enlarged head of said fastening member.

* * * * *